Figure 10:
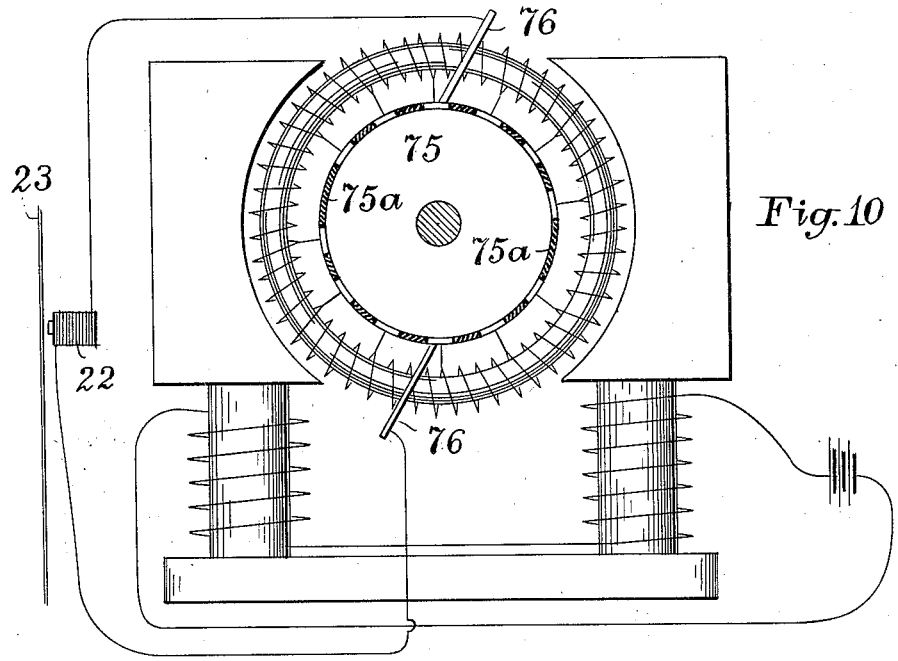

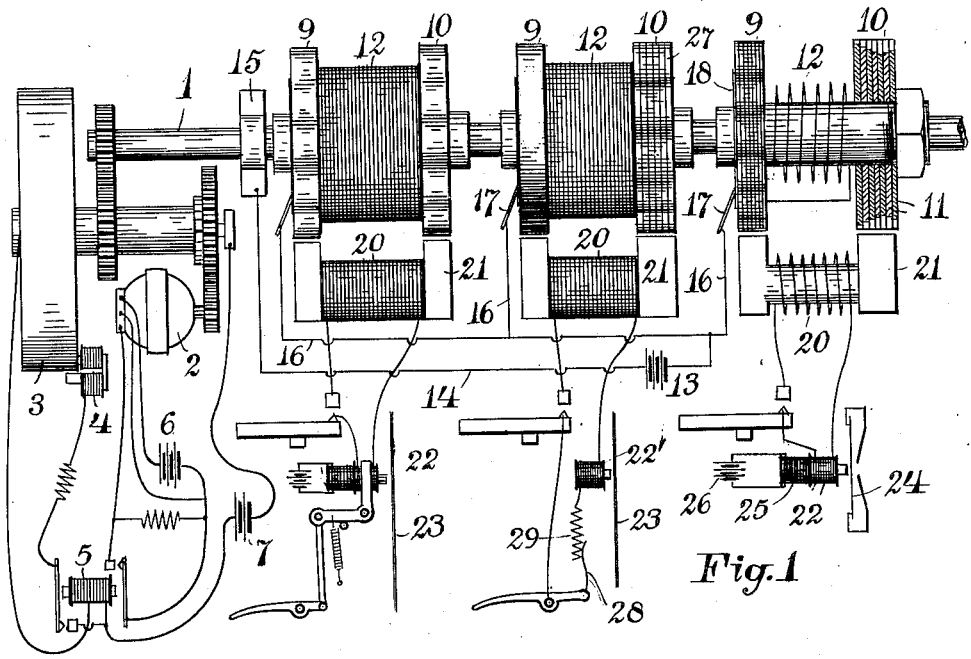

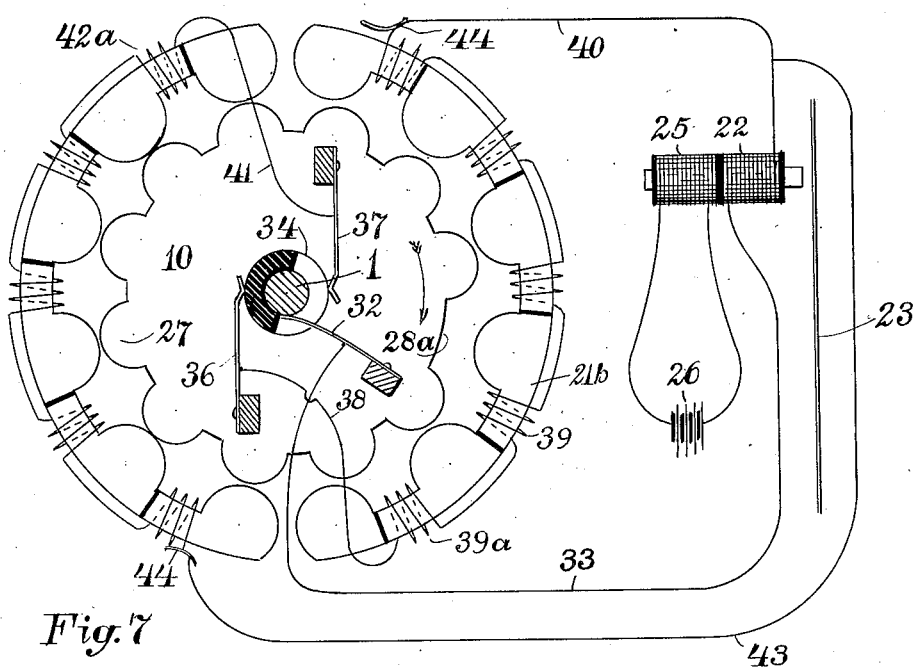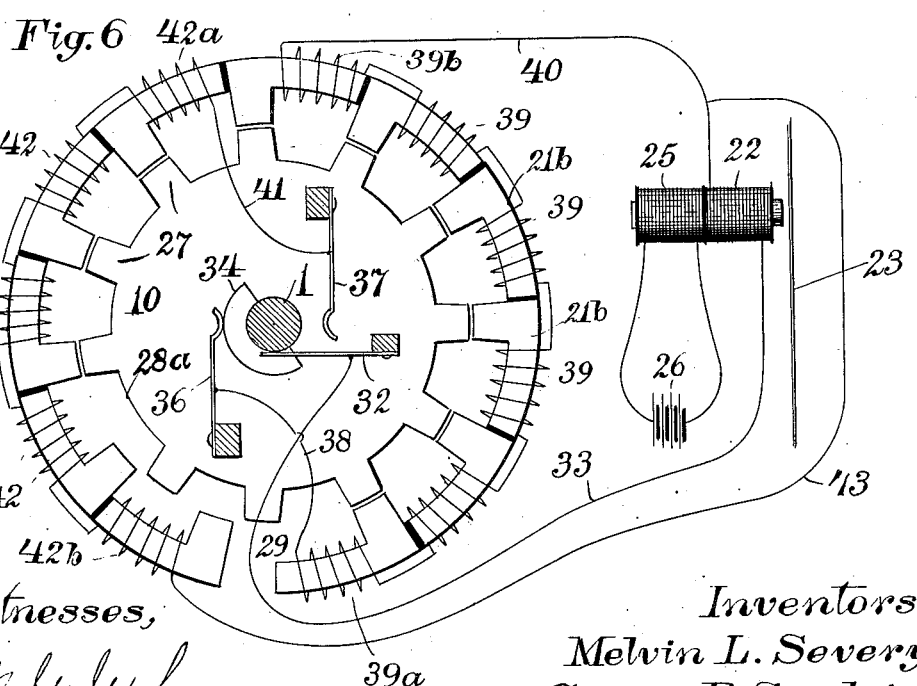

M. L. SEVERY & G. B. SINCLAIR.
TONE PRODUCING MEANS.
APPLICATION FILED FEB. 25, 1910.
1,137,544.
Patented Apr. 27, 1915.
4 SHEETS—SHEET 3.
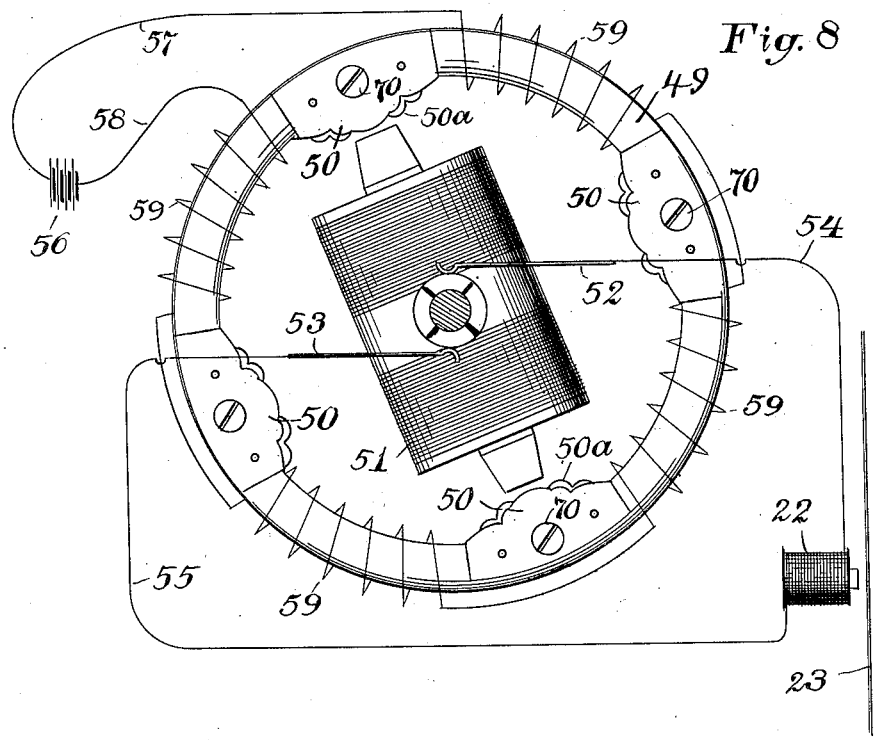
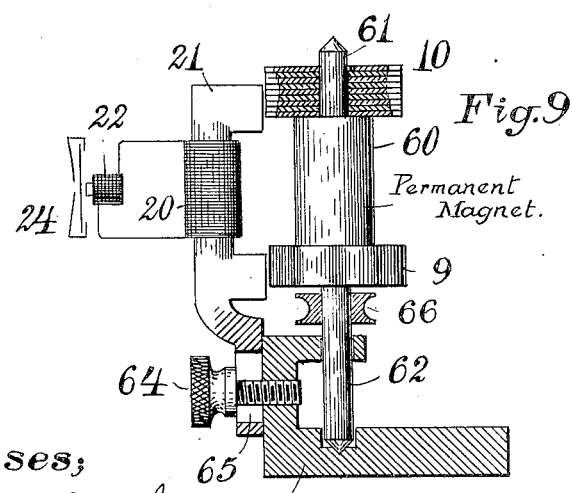
Witnesses;
M. W. Upham
E. H. White
Inventors,
Melvin L. Severy,
George B. Sinclair;
By A. B. Upham
Attorney.

M. L. SEVERY & G. B. SINCLAIR.
TONE PRODUCING MEANS.
APPLICATION FILED FEB. 25, 1910.

1,137,544.

Patented Apr. 27, 1915.
4 SHEETS—SHEET 4.

Witnesses;
E. E. Waite
M. P. Healy.

Inventors,
Melvin L. Severy,
George B. Sinclair;
By
A. B. Upham.
Attorney

UNITED STATES PATENT OFFICE.

MELVIN L. SEVERY, OF ARLINGTON HEIGHTS, AND GEORGE B. SINCLAIR, OF MEDFORD, MASSACHUSETTS.

TONE-PRODUCING MEANS.

1,137,544.   Specification of Letters Patent.   Patented Apr. 27, 1915.

Application filed February 25, 1910.   Serial No. 545,982.

*To all whom it may concern:*

Be it known that we, MELVIN L. SEVERY, of Arlington Heights, in the county of Middlesex and Commonwealth of Massachusetts, and GEORGE B. SINCLAIR, of Medford, in the said county and Commonwealth of Massachusetts, both citizens of the United States, have invented certain new and useful Improvements in Tone-Producing Means, of which the following is a specification.

Our invention has for its object the production of musical tones of any desired timbre by improved means employing current interruptions or alternations; the production of musical tones of relatively incommensurate vibrations, and the production of musical tones of easily changeable timbre.

We are aware that previous to this, a plurality of sets of electrical pulsations of different frequencies have been combined to give a resultant wave-form; but our invention differs therefrom in that we take a plurality of metallic elements each capable of producing certain magnetic effects in accordance with its conformation, size, thickness and the like, and combine the same to produce a total magnetic effect adapted to be imparted to an electromagnetic translating device.

Referring to the drawings forming part of this specification, Figure 1 is an elevation of means for the production of musical tones in accordance with the first-recited object. Fig. 2 is a face view of one of the removable elements used in the synthetic production of various qualities or timbres of such tones. Fig. 3 is a similar view of a plurality of such elements combined. Fig. 4 is a face view of one of said elements of different peripheral contour. Fig. 5 is a similar view of still another form of such elements. Fig. 6 is a view of a rotor and stator wherein the latter is formed with a considerable number of pole pieces adapted to simultaneously receive and transmit to the translating device like current alternations and thereby reinforce the same. Fig. 7 is a similar view of a slightly different construction of the same. Fig. 8 is still another form of alternating device. Fig. 9 is a sectional elevation of a form of the device adapted as a scientific apparatus or as a toy. Fig. 10 is a form of the invention wherein a gram ring is employed.

In the form of tone producing means illustrated in Fig. 1 the reference numeral 1 designates a shaft rotated at a uniform speed by an electric motor 2 synchronized by the copper drum 3 revolving between the fields of the electromagnet 4, and by the relay 5 controlling the currents from source 6 and 7. No claim is made herein to the synchronizer so referred to and illustrated, the same being set forth in applications Serial Nos. 619,633 and 620,002, filed in the name of Melvin L. Severy on April 7th, 1911, and April 10th, 1911, respectively, wherein the same is claimed. Upon this shaft are spools having heads 9 and 10 between which are wound the coils of insulated wire 12 through which continuous current is flowing from a source 13; the circuits comprising a wire 14 leading to a shaft-bearing 15, and wires 16 connected with brushes 17 engaging suitable conducting surfaces 18 which are joined to one end of each coil 12, while the opposite terminal of each coil is in circuit with the shaft 1. The peripheries of said heads are made undulatory or toothed as shown in Figs. 2, 4 and 5, and they may be solid as is shown by the left hand spool in Fig. 1, but they are preferably laminated, as at the right hand end of the shaft. The object in thus laminating the heads is to permit of the production of different timbres in the sounds emitted by the translating devices, as hereinafter set forth. It is in the windings 20 of the electromagnets that the induced alternating currents caused by the movements of the magnetized spools or rotors through the field of the pole pieces or stators 21 are produced, and such currents being transmitted to the polarized electromagnets 22, cause the latter intermittently to attract the string 23 and diaphragm 24, respectively. Said electromagnets 22 should be polarized, in order to cause non-attractive intervals for the recession of the sonorous bodies. To thus polarize said electromagnets, each may be given an extended core wound with a coil 25 taking continuous current from a suitable source 26. When these coils 22 and 25 receive currents of like polarity, such core becomes doubly magnetic, and strongly attracts the sonorous body in its field; but when, during the opposite phase of each alternation the two currents are of unlike polarity, the polarity of said core is neutralized and said sonorous body released. Consequently, such sonorous body will be alternately attracted and released to suitably vibrate it. When, however, the teeth 27 are located far enough apart to reduce the currents to practically zero for periods equaling those when the currents are flowing, then it is unnecessary to polarize the electromagnets. Such widely separated teeth are illustrated in Fig. 5, and a non-polarized electromagnet 22' shown in Fig. 1 between the polarized magnets above described.

The strength of magnetic impulses, and consequent loudness of vibrations, can be varied by shifting the contact brush 28 along the resistance 29, shown connected with said non-polarized electromagnet 22'; or the loudness can be varied by moving the electromagnet relative to the sonorous body, as illustrated for the left hand string 23 in Fig. 1.

Inasmuch as each movement of a tooth 27 (Fig. 1) past a pole piece 21 energizes the electromagnet 22 connected therewith, the strength of energization, and consequently the loudness of the sonorous vibrations caused thereby, can be multiplied by increasing the number of teeth and pole pieces simultaneously acting to energize such electromagnet. Such an increase in pole pieces 21 is shown in Fig. 2. To thus increase the pole pieces, it is of course necessary to properly space them so that the angular distances between them shall exactly equal or be some multiple of that between the teeth. So long as there is a non-fractional number of said teeth about the rotor heads, it is easily practicable to thus multiply the pole pieces; but whenever, as in the majority of the strings of a musical instrument, it is necessary to provide pulsations for sonorous bodies which vibrate incommensurately with respect to the others, and incommensurate rotors are accordingly used, it is impossible thus to surround the entire rotor with pole pieces. We have however devised means for providing one-half the rotor with simultaneously effective pole pieces, as follows: As shown in Figs. 6 and 7, a rotor head 10 is formed with teeth 27 one or more spaces between which are abnormal, as at 28$^a$, which space absorbs the fractional tooth that would otherwise occur thereat. Referring to Fig. 6, it will be seen that about such rotor head 10 is located a number of pole pieces equal in number to the teeth 27 and with the same angular spaces between them, one of the latter, 29, being abnormal. As is evident on inspection, a number of the teeth and pole pieces will not meet simultaneously with others. We therefore provide an automatically actuated switching means for cutting out of the circuit to the electromagnet 22 the windings of the pole pieces which are not met by the teeth at the same instant as are the others. This is done as follows: In continuous contact with the shaft 1 of the rotor is a brush 32 joined by a wire 33 to the electromagnet 22; and fixed on said shaft is a semi-circular contact piece 34 in circuit therewith. At diametrically opposite sides of the shaft and in contact with said contact piece when the latter passes them, are two brushes 36, 37; the brush 36 being joined by wire 38 to one terminal coil 39$^a$ of the set of tandem coils 39 wound about the pole-pieces 21$^b$, while the opposite terminal coil 39$^b$ is joined by wire 40 to the electromagnet 22. Said other brush 37 is joined by wire 41 to the terminal coil 42$^a$ of the tandem coils 42, and the opposite terminal coil 42$^b$ is joined by wire 43 to the wire 40, and by the latter to said electromagnet. Hence the pole pieces of the group at the moment confronted by the abnormal space 28$^a$ will be cut out from the circuit to the electromagnet 22, while the pole pieces of the group not so confronted will be in such circuit, and this condition will continue throughout every revolution of the rotor. In other words, that group of the stator pole pieces represented by one system of wiring will, whenever any of its pole pieces are confronted by the abnormal rotor space 28$^a$, be cut out, but during such time the pole pieces of the group represented by the other system of wiring will be in circuit. The construction illustrated in Fig. 7 differs from that in Fig. 6 in two particulars,—the shape of the teeth and pole pieces, and the grouping of the pole pieces in such a manner as to bring an abnormal space at each of two diametrically opposite points in the pole pieces, thereby dividing up the same into two smaller fractions in place of the single larger one. Another slight difference lies in the arrangement illustrated in Fig. 7 whereby the loudness of the sonorous vibrations can be reduced at pleasure by cutting out more or less of the pole pieces, as by shifting the brushes 44 of the wires 40, 43 along toward the coils 39$^a$ and 42$^a$ respectively. The specific construction shown in these Figs. 6 and 7 is not herein claimed, though described and illustrated for the purpose of more fully disclosing the complete invention. It forms the subject matter of a divisional application, Serial No. 855,885, filed August 8, 1914, in which the irregular or abnormal spacing constitutes the distinguishing feature.

In the construction set forth in Fig. 8, the stator is shown as a ring having enlargements 50 thereon, and a bi-polar rotor 51 whose brushes 52, 53 are joined by wires 54, 55 to the electromagnet 22 controlling the sonorous body 23. Said ring 49 has its windings supplied with energizing currents from a suitable source 56 connected by wires 57, 58 to said windings 59. Said enlargements 50 are shown as formed with timbre-modifying undulations 50$^a$ adapted to produce a plurality of increments and decrements of current for each wave produced. Said enlargements may be each composed of a plurality of removable plates held by screws 70, by means of which the timbre of the sonorous vibrations can be altered at will.

The rotor at the extreme left in Fig. 1, is illustrated as provided with solid heads 9 and 10, but at the other extreme a rotor is shown with both heads composed of comparatively thin disks 11; the intermediate rotor being represented with one solid and one laminated head. Such disks being made removable, the timbre of the tones produced thereby can be changed to any extent by changing the disks; by adding to the disks arranged for one note, other disks bearing different shapes or numbers of teeth; by replacing a part of the disks with differing ones; by simply shifting certain of the disks angularly with respect to each other or to the others, or by varying the relative number of differing disks. Fig. 3 shows such disks 11 angularly shifted, the same being formed with holes 60 through which a suitable pin can be inserted for holding them in predetermined angular adjustments.

The angular shifting of certain of the disks 11 in each head is made to change the timbre of the sounds emitted by the associated translating device, in the following way. Suppose each disk of a head has twelve teeth, as in Fig. 2, and one of such disks is angularly shifted to present its teeth half way between the teeth of the other disks, as in Fig. 3, then if there are seven disks in all, as indicated at the extreme right in Fig. 1, there will be emitted by the translating device a musical tone with a strong fundamental and a weak harmonic an octave higher in pitch produced by the shifted disk. If more of the disks are shifted to the same degree, a different timbre still will be produced; and if one or two of the disks are shifted one half as far, another harmonic is added, the pitch of which is two octaves above the fundamental, and still another timbre of musical tone is educed from the translating device. By having the laminations or disks sufficiently numerous upon each head, the experimenter can produce an almost limitless range of different tone-qualities from the same apparatus. When the disks are thus changed on one head alone, it is well to have the other head of the rotor formed with an unbroken or cylindrical periphery, in order that the pulsations of the changed head may not be affected by the other; although a good effect is produced by having one head of a rotor toothed to give the fundamental pulsations of the sonorous body connected therewith, while the other head thereof is provided with a solid head bearing harmonically related teeth, or with a laminated head arranged for thus varying the timbre of the vibrations of the sonorous body.

In the form of the device shown in Fig. 9, a permanent magnet 60 is preferably employed, the thin disks composing the head 10 being removably applied upon the pin 61, and the rotor turning with its spindle 62 supported in bearings 63, and set in motion in any well known manner, as by the pulley 66 or by a cord wrapped about said spindle similarly to a top. The stator is adjustably attached to the base by a screw 64 passing through a slot 65, and thereby enabled to be raised and lowered relative to the rotor to present a greater or less extent of pole piece to the head 10. This adjustment acts both to vary the loudness of the produced note, and to change its timbre by depressing the pole piece below the effect of certain of the elements composing said head. It is obvious the pole piece could be moved in either direction to produce the same result. The purpose of this device is to illustrate the synthetic production of different tone qualities, and the variation thereof to an almost limitless extent.

In Figs. 6 and 7 for the sake of clearness, we have shown but one rotor on each shaft, with its opposing stator, but it is manifest that in a musical instrument having a number of musical pitches, we should use a plurality of these rotors and stators, and each shaft 1, (Fig. 6) would preferably carry a group of rotors. In most instruments, there would be several of these groups moving at speeds commensurate with each other. It is clear therefore that if commensurate speeds are to produce trains of timed current impulses, the said trains being incommensurate with each other, there must be at least one break in some of the cycles of impulses. For example, if the speed of the generating device be suited, say, to C, and C be without fractional provision, as it usually would be, then C# revolving either fixedly or commensurately with C, would require fractional provision, and we have moreover determined by years of experimentation that this fractional provision does not make its presence felt in the resulting tone of the tuned sonorous body.

In Fig. 10 is illustrated a form of our tone producing means wherein the rotor and stator are substantially similar to a well-known type of electric generator. The main difference consists in omitting the wiring to each alternate commutator section 75 in order that instead of a continuous current being delivered through the brushes 76 to the electromagnet 22, a series of current pulsations will be transmitted thereto and its string 23 will be vibrated thereby. To adapt this generator for incommensurate impulses relative to other generators rotating commensurately therewith, an abnormally sized dead section 75ª is made to take the place of what would otherwise be a fractional section as illustrated in said Fig. 10.

What we claim as our invention and for which we desire Letters Patent is as follows, to wit;—

1. A tone-producing means comprising a rotor and a stator, one thereof being magnetic, and the other having windings thereon, and an electromagnetic translating device in circuit with said windings; said rotor having a head composed of a plurality of easily removable disks each formed with peripheral teeth, the disks being changeable for the purpose of differently relating to each other the teeth of the various disks and thereby producing different tone-qualities.

2. A tone-producing means comprising a rotor and a stator, one thereof being magnetic, and the other having windings thereon, and an electromagnetic translating device in circuit with said windings; said rotor having a head composed of a plurality of removable disks formed with equal peripheral teeth and made angularly adjustable relative to each other for the purpose of producing different tone-qualities.

3. A tone producing instrument comprising an electromagnet, a sonorous body vibrated thereby, a rotor consisting of a uniformly rotated spool having its axis of rotation coincident with its own axis, windings on said spool, a head at one end of said spool having a toothed periphery concentric with said axis, a current source and connections between the same and said windings, a stator having a pole piece presented to said teeth, and windings on said stator in circuit with said electromagnet.

4. A tone producing instrument comprising an electromagnet, a sonorous body vibrated thereby, a rotor consisting of a uniformly rotated cylindrical spool concentric with its axis of rotation, windings on said spool, a head at each end of said spool each head having a toothed periphery concentric with said axis, a current source and connections between the same and said windings, a stator having pole pieces presented to said heads, and windings on said stator in circuit with said electromagnet.

5. A tone-producing instrument comprising an electromagnet, a sonorous body vibrated thereby, a rotor consisting of a uniformly rotated spool concentric with its axis of rotation, windings on said spool, a head at an end of said spool having its periphery concentric with said axis, said head being composed of a plurality of thin disks angularly adjustable relative to each other to present their teeth in different relations, a stator having a pole piece presented to said head, and windings on said stator in circuit with said electromagnet.

6. A tone-producing instrument comprising an electromagnet, a sonorous body vibrated thereby, a rotor uniformly rotated and having numerous equally spaced teeth, and a stator having pole pieces equally spaced and presented to several of said teeth, said rotor having windings, a current source and connections between the same and said windings, windings on said stator, and connections between the stator windings and said electromagnet.

In testimony that we claim the foregoing invention, we have hereunto set our hands this 29th day of January, 1910.

MELVIN L. SEVERY.
GEORGE B. SINCLAIR.

Witnesses:
A. B. UPHAM,
CHARLES GARRISON.